United States Patent [19]

Taga et al.

[11] Patent Number: 5,166,107
[45] Date of Patent: Nov. 24, 1992

[54] PROCESS FOR PREPARATION OF ANORTHITE SINTERED BODY

[75] Inventors: Genji Taga, Shin-nanyo; Masaki Noritake, Tokuyama; Masami Enokuchi, Shin-nanyo, all of Japan

[73] Assignee: Tokuyama Soda Kabushiki Kaisha, Yamaguchi, Japan

[21] Appl. No.: 215,517

[22] Filed: Jul. 6, 1988

[30] Foreign Application Priority Data

Jul. 6, 1987 [JP] Japan .................. 62-166876
Jul. 6, 1987 [JP] Japan .................. 62-166877

[51] Int. Cl.$^5$ .................. C04B 35/18; C04B 35/20; C04B 35/22
[52] U.S. Cl. .................. 501/119; 501/122; 501/128; 423/717
[58] Field of Search .................. 501/1, 119, 122, 128; 423/328

[56] References Cited

U.S. PATENT DOCUMENTS

| | | | |
|---|---|---|---|
| 1,759,919 | 5/1930 | Singer | 423/328 |
| 2,102,976 | 12/1937 | Seil | 423/328 |
| 2,920,971 | 1/1960 | Stookey | 501/2 |
| 3,365,318 | 1/1968 | Sack | 501/128 |
| 3,365,888 | 1/1968 | Nameishi | 501/128 |
| 3,490,888 | 1/1970 | Strong | 65/33 |
| 3,531,303 | 9/1970 | Bahat | 501/8 |
| 3,826,813 | 7/1974 | Gardner et al. | 423/328 |
| 3,885,977 | 5/1975 | Lachman et al. | 501/128 |
| 3,926,648 | 12/1975 | Miller | 501/9 |
| 3,940,255 | 2/1976 | Harrington et al. | 65/33 |
| 3,954,672 | 5/1976 | Somers et al. | 501/119 |
| 3,979,216 | 9/1976 | Fritsch, Jr. et al. | 501/119 |
| 4,033,779 | 7/1977 | Winkler | 501/119 |
| 4,063,955 | 12/1977 | Fritsch, Jr. et al. | 501/9 |
| 4,125,408 | 11/1978 | Pieper | 501/119 |
| 4,142,879 | 3/1979 | Fritsch, Jr. et al. | 501/9 |
| 4,162,921 | 7/1979 | Litvinov et al. | 501/9 |
| 4,187,115 | 2/1980 | Reade | 501/8 |
| 4,194,917 | 3/1980 | Sakemi et al. | 501/119 |
| 4,235,855 | 11/1980 | Cleveland | 423/327 |
| 4,280,845 | 7/1981 | Matsuhisa et al. | 501/119 |
| 4,300,953 | 11/1981 | Lachman | 501/112 |
| 4,304,603 | 12/1981 | Grossman et al. | 501/9 |
| 4,316,965 | 2/1982 | Oda et al. | 501/128 |
| 4,403,017 | 9/1983 | Bind | 428/702 |
| 4,434,117 | 2/1984 | Inoguchi et al. | 264/56 |
| 4,460,916 | 7/1984 | Hashimoto et al. | 501/128 |
| 4,495,300 | 1/1985 | Sano | 501/102 |
| 4,555,493 | 11/1985 | Watson et al. | 501/128 |
| 4,568,402 | 2/1986 | Ogawa et al. | 501/119 |
| 4,576,919 | 3/1986 | Hodge | 501/9 |
| 4,587,067 | 5/1986 | Agrawal et al. | 264/63 |
| 4,814,303 | 3/1989 | Chowdhry et al. | 501/119 |

Primary Examiner—William R. Dixon, Jr.
Assistant Examiner—Anthony J. Green
Attorney, Agent, or Firm—Sherman and Shalloway

[57] ABSTRACT

Disclosed is a process for the preparation of an anorthite sintered body, which comprises preparing a formed body of at least one powder selected from the group consisting of (i) a calcium type zeolite having an $SiO_2/Al_2O_3$ molar ratio lower than 3, (ii) an amorphous calcination product obtained by calcining said calcium type zeolite and (iii) a mixture of said calcium type zeolite or said amorphous calcination product and an alkaline earth metal compound, and sintering the formed body at a temperature lower than 1000° C.

20 Claims, 3 Drawing Sheets

X TYPE ZEOLITE

PROCESS FOR PREPARATION OF ANORTHITE SINTERED BODY

BACKGROUND OF THE INVENTION

The present invention relates to an anorthite sintered body and a process for the preparation thereof.

As the electric insulator for electronic parts such as an IC package, a sintered body of an inorganic powder such as alumina is most widely used since this sintered body is excellent in electrical characteristics and mechanical characteristics. Recently, sintered bodies of this type are often manufactured according to the so-called cofiring technique of printing an electronic circuit on a formed body of an inorganic powder before sintering by using an electroconductive substance and sintering the formed body to form an electrically insulating material having a circuit printed thereon. However, this technique is defective in that since a high temperature is generally required for sintering an inorganic powder, the printing cannot be accomplished without using an expensive electroconductive substance capable of resisting such a high temperature. For example, in case of an alumina powder, since a sintering temperature higher than 1500° C. is necessary, an expensive electroconductive substance such as Mo, Mn, or W has to be used. Moreover, electroconductive substances of this type are not sufficiently satisfactory in the electrical conductivity. Accordingly, investigations have been made to find out a sintered body capable of being cofired with a substance having a good electrical conductivity, such as Ag, Au or Cu, and a variety of low-temperature sintered bodies have been proposed. However, a technique of preparing a low-temperature sintered body industrially stably at a low manufacturing cost has not been established.

SUMMARY OF THE INVENTION

It is therefore a primary object of the present invention to provide a technique of preparing a sintered body of low-temperature sintering.

Another object of the present invention is to provide a sintered body which can be obtained by the cofiring technique using a material having a good electroconductivity.

Still another object of the present invention is to provide a new preparation process capable of providing a sintered body suitable for a low-temperature sintered substrate.

Other objects of the present invention will become apparent from the following detailed description.

In accordance with the present invention, the foregoing objects can be attained by a process for the preparation of an anorthite sintered body, which comprises preparing a formed body of at least one powder selected from the group consisting of (i) a calcium type zeolite having an $SiO_2/Al_2O_3$ molar ratio lower than 3, (ii) an amorphous calcination product obtained by calcining said calcium type zeolite and (iii) a mixture of said calcium type zeolite or said amorphous calcination product and an alkaline earth metal compound, and sintering the formed body at a temperature lower than 1000° C., and an anorthite sintered body prepared according to this preparation process.

DETAILED DESCRIPTION OF THE PREFERRED EMBODIMENTS

Figure 1:
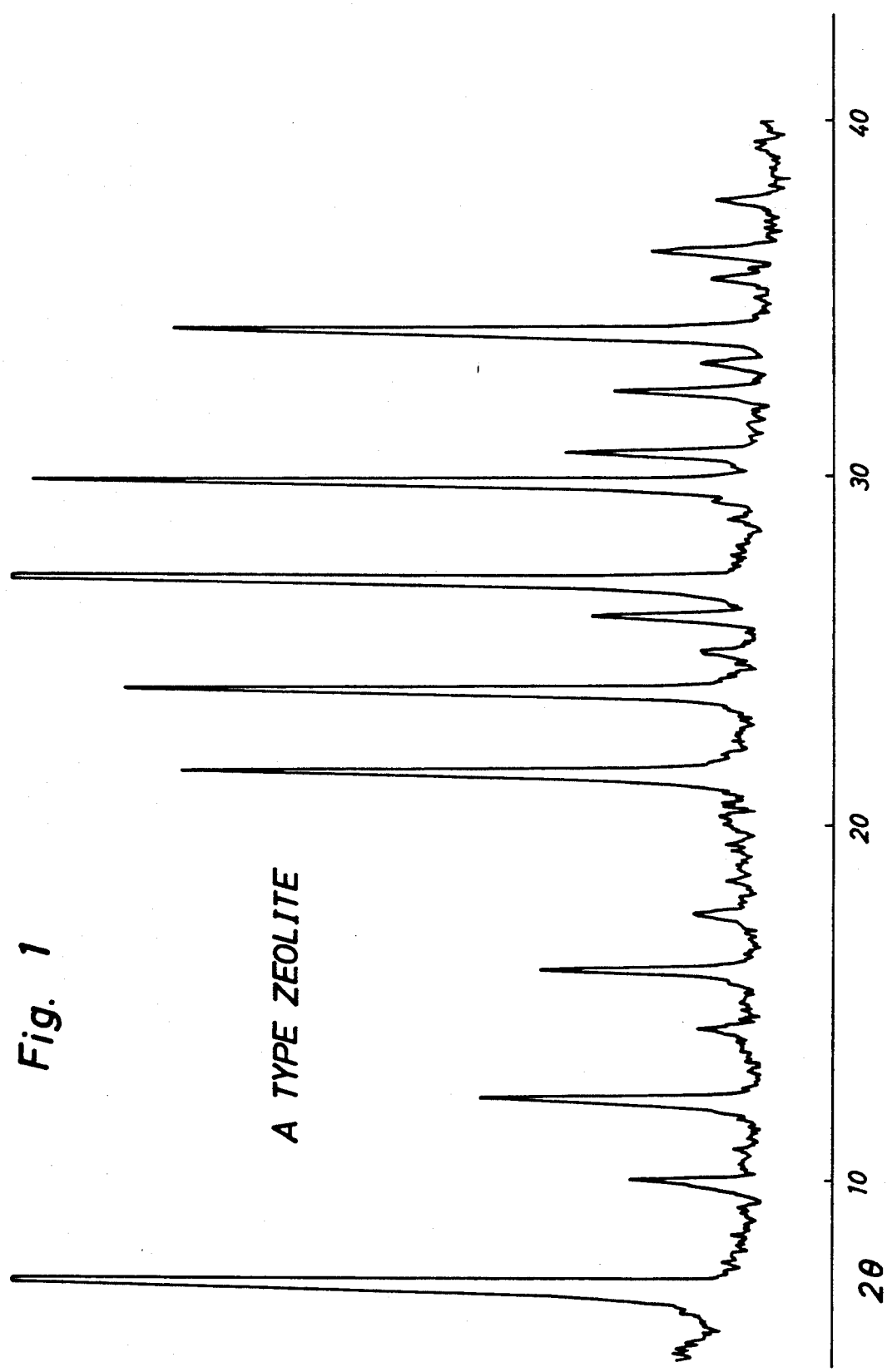
FIG. 1 is an X-ray diffraction chart of zeolite 5A prepared in Example 1.

The anorthite sintered body prepared according to the process of the present invention is a known substance. Anorthite has heretofore been prepared by sintering a mixture of calcium hydroxide and kaoline at a temperature higher than 1400° C. However, a high temperature exceeding 1400° C. is necessary for obtaining a sintered body from the so-obtained anorthite, and this anorthite cannot be used as a ceramic material for low-temperature sintering.

In contrast, the anorthite sintered body provided according to the present invention can be prepared by carrying out sintering at a low temperature lower than 1000° C., preferably a temperature of 850° to 950° C., and therefore, the anorthite sintered body of the present invention is very valuable as a substrate of an electronic part.

The starting material used for the preparation of the anorthite sintered body in the present invention is at least one powder selected from the group consisting of (i) a calcium type zeolite having an $SiO_2/Al_2O_3$ molar ratio lower than 3, (ii) an amorphous calcination product obtained by calcining said calcium type zeolite and (iii) a mixture of said calcium type zeolite or said amorphous calcination product and an alkaline earth metal compound.

The most important feature of the present invention is that the starting material to be subjected to sintering is a calcium type zeolite having an $SiO_2/Al_2O_3$ molar ratio lower than 3, preferably not more than 2.5, or a calcination product thereof. The calcium type zeolite is a compound in which at least 90% of the ion exchange component is exchanged with calcium, as described hereinafter. Even if a zeolite in which the ion exchange component is exchanged with other cation, for example, magnesium, barium or sodium, is used, the objects of the present invention cannot be attained at all.

The above-mentioned calcium type zeolite is a known compound. Any of known calcium type zeolites can be used, so far as the $SiO_2/Al_2O_3$ molar ratio is lower than 3.

The X-ray diffractometry is generally adopted for determining whether or not a zeolite is of the calcium type. In the X-ray diffraction pattern, characteristic diffraction angles of the calcium type zeolite differ to some extent according to the type of zeolite, and there are known charts of the respective types of zeolites. For example, in the X-ray diffraction chart of A-type calcium type zeolite, diffraction angles ($2\theta$) appear at 29.8°, 27.0°, 23.9° and 21.5°, and in the X-ray diffraction chart of X-type calcium type zeolite, diffraction angles ($2\theta$) appear at 23.2°, 26.6° and 30.9°.

Zeolites are compounds generally known as ion exchange members. Typical zeolites preferably used in the present invention are represented by the following general formula (I):

$$(jCaO\ kM_{2/x}O).lAl_2O_3.mSiO_2.nH_2O \qquad (I)$$

wherein M stands for a cation, x indicates the valency of the cation M, j is a number satisfying the requirement of j+k=1, k is a number of from 0 to 0.1, l is a number of from 0.9 to 1.1, m is a number of from 1.5 to 3, m/l (molar ratio) is lower than 3, and n is 0 or a positive number.

As is apparent from the above formula, the calcium type zeolite is a generic term for zeolites in which at least 90% of the ion exchange component is occupied by CaO. In the general formula (I), M is at least one cation that can be ion-exchanged. Since a sodium type zeolite is often used as the starting material for the production of the calcium type zeolite, the cation M is sodium in many cases. Of course, a zeolite in which a part of all of the sodium component is replaced by other cation can be similarly used. It seldom happens that the presence of the cation M hinder the production of the anorthite sintered body intended in the present invention, but the presence of a small amount of the cation M is sometimes advantageous. For example, if the sodium component is contained in an amount of 0.1 to 2% by weight (corresponding to k of 0.005 to 0.1 in the general formula (I)), the sintering temperature can be further lowered. Accordingly, in the calcium type zeolite used in the present invention, the presence or content of other cation component can be optionally determined according to need, so far as the calcium component is contained in an amount of at least 90%.

As the calcium type zeolite especially preferably used in the present invention, there can be mentioned zeolite 5A, zeolite X, gismondine and laumontite. However, a calcium type zeolite having an $SiO_2/Al_2O_3$ molar ratio of higher than 3, for example, mordenite ($CaO \cdot Al_2O_3 \cdot 10SiO_2 \cdot 6H_2O$), cannot be used as the starting material in the present invention.

Another starting material used in the present invention is an amorphous calcination product obtained by calcining the above-mentioned calcium type zeolite. If a formed body of the calcium type zeolite is directly sintered, contraction of the volume is caused as in ordinary ceramics. In the case where this contraction of the volume is not desired, it is preferred that an amorphous product obtained by calcining the calcium type zeolite at a low temperature, for example, 800° to 900° C., be used as the starting material. Advantageously, if the calcium type zeolite is calcined at a low temperature, phase transition to an amorphous compound is caused, and if the calcination temperature is elevated, phase transition to an anorthite crystal is caused. In general, the transition to an amorphous phase is accomplished by carrying out calcination at a temperature of 800° to 900° C. for 1 to 5 hours, and the amorphous calcination product is present in a stable state. Moreover, if this amorphous calcination product is molded and the formed body is sintered, a sintered body can be obtained at a low sintering temperature, and the contraction of the volume observed at this sintering is much smaller than the contraction of the volume observed when a formed body of the calcium type zeolite is directly sintered. However, if the calcination temperature is elevated at the step of obtaining an amorphous calcination product of the calcium type zeolite, the phase transition to an anorthite crystal is caused, as pointed out hereinbefore, and if anorthite is thus formed, sintering becomes impossible at a low temperature below 1000° C., and a high temperature exceeding 1200° C. is necessary for obtaining a sintered body. Accordingly, in this case, the intended objects of the present invention cannot be attained. Therefore, in order to obtain an amorphous calcination product of the calcium type zeolite, it is necessary to determine in advance conditions not forming anorthite and carry out calcination under the so-determined conditions.

In the present invention, a powder of alumina, silica or calcia may be present in the calcium type zeolite to be calcined or sintered, so far as the composition of the calcium type zeolite is not significantly changed, and this embodiment can be adopted according to need.

Furthermore, according to the present invention, a mixture of an alkaline earth metal compound and the above-mentioned amorphous calcination product can be used for further lowering the sintering temperature. For example, there can be adopted an embodiment in which the calcium type zeolite is mixed with an alkaline earth metal compound and a formed body of the mixture is calcined under the above-mentioned conditions.

The above-mentioned calcium type zeolite or the amorphous calcination product obtained by calcining the calcium type zeolite is used as the starting material in the form of a powder having a desired particle size. In general, a commercially available powdery product can be used. However, it is preferred that a powder having a particle size smaller than 5 μm, especially smaller than 2 μm, be used as the starting material.

Another type of the starting material to be used in the present invention is a mixture of the above-mentioned calcium type zeolite or amorphous calcination product and an alkaline earth metal compound. The alkaline earth metal compound acts effectively for lowering the crystallization temperature of the anorthite sintered body. The kind of the alkaline earth metal compound is not particularly critical, and known compounds can be used. In general, oxides and compounds capable of being converted to oxides at the calcining or sintering step are preferred. Namely, oxides, hydroxides, nitrates and carbonates are generally preferred. As the alkaline earth metal, there can be mentioned beryllium, magnesium, calcium, strontium and barium. In view of the handling property, the price and the effect, magnesia and calcia are most preferred as the alkaline earth metal compound.

The alkaline earth metal compound is generally used in the form of a powder, and a small particle size is ordinarily preferred. Namely, it is preferred that the alkaline earth metal compound be used in the form of a powder having an average particle size smaller than 5 μm, especially smaller than 1 μm.

The amount added of the alkaline earth metal compound is changed according to the kind, the particle size, the composition of the zeolite and the like, and the amount cannot be simply defined. In general, however, it is preferred that the alkaline earth metal compound be added in such an amount that the content of the alkaline earth metal compound in the starting material is up to 5% by weight, especially 0.01 to 3% by weight, particularly especially 0.1 to 1.0% by weight, as calculated as the oxide.

In the present invention, the starting material should be molded prior to sintering. The shape of the formed body is determined in view of the intended shape of the final product and the contraction of the volume to be caused at the sintering step. A rod-like shape, a conical shape, a sheet-like shape and the like can be adopted without any limitation. Moreover, the forming method and apparatus are not particularly critical, and known methods and apparatuses can be adopted. According to a most popular method, the powdery starting material is filled in a mold having a specific shape and molding is carried out under pressure or pressurelessly. Alternately, a green sheet forming method using a doctor blade may be adopted. At the forming step, a binder can be used for forming and sintering ceramics can be used without any limitation. In general, organic polymeric compounds such as polyvinyl butyral, polyvinyl alcohol and poly(methyl methacrylate) are preferably used as the binder.

In the present invention, the formed body is sintered to obtain an anorthite sintered body. One of the important features of the present invention is that low-temperature sintering is adopted for formation of the sintered body. Namely, in the present invention, a low temperature lower than 1000° C., preferably 850° to 950° C., is adopted for the sintering. The sintering time is not particularly critical, but the sintering is preferably carried out for 1 to 5 hours. The sintering is sufficiently advanced even in an oxygen-containing atmosphere, for example, air. However, in the case where an oxygen-containing atmosphere is not suitable for a printed material or the like at the sintering such as cofiring, an inert atmosphere such as nitrogen or carbon dioxide can be adopted according to need.

The sintered body obtained according to the present invention is an anorthite sintered body. This can be confirmed by the X-ray diffractometry. Namely, in the X-ray diffraction chart, peaks inherent to anorthite appears at diffraction angles (2θ) of 28.15 to 27.62°, 24.18 to 23.79° and 22.22 to 21.57°.

The anorthite sintered body obtained according to the present invention generally has a composition represented by the following formula:

$$(pCaO.qM_{2/x}O).Al_2O_3.2SiO_2 \quad (II)$$

wherein M stands for a cation, x indicates the valency requirement of p+q=1 and q is a number of from 0 to 0.1.

Incidentally, according to the composition of the starting material, it sometimes happens that one or more components are excessively present in addition to the above-mentioned anorthite composition. In this case, this excessive component is often present in the form of glass in the grain boundary of the sintered body.

If the sintering temperature is too low or the sintering time is insufficient, it sometimes happens that calcium aluminate is formed together with anorthite according to the composition of the starting material. In this case, complete anorthite can be formed by elevating the sintering temperature or prolonging the sintering time.

The anorthite sintered body obtained according to the present invention is excellent in electrical characteristics and mechanical characteristics, and therefore, the sintered body is preferably used as an electrical insulator. This effect of obtaining a sintering body having such excellent characteristics by carrying out the sintering at a low temperature lower than 1000° C. makes a great contribution to the production of a circuit substrate, on which a circuit is to be printed, by cofiring.

In the production of the anorthite sintered body of the present invention, an inorganic filler customarily used for low-temperature-sintered ceramics can be added so as to increase the mechanical strength of the sintered body. However, in order to maintain good properties of the anorthite sintered body, it is preferred that the inorganic filler be added in an amount of up to 30% by weight. As the preferred inorganic filler, there can be mentioned alumina, cordierite, farsterite, mullite and quartz.

The present invention will now be described in detail with reference to the following examples and comparative examples that by no means limit the scope of the invention.

Incidentally, data shown in these examples and comparative examples were obtained according to the following methods.

(i) Flexural Strength (kg/cm²)

The three-point bending strength was measured according to the bending strength test method for fine ceramics, specified in JIS R-1601.

(ii) Density (g/cc) of Sintered Body

The density of the sintered body was measured according to the Archimedean method.

(iii) Confirmation of Anorthite Crystal

Formation of anorthite was confirmed by peaks appearing at diffraction angles (2θ) of 28.15 to 27.62°, 14.18 to 23.79° and 22.22 to 21.57° in the X-ray diffraction pattern.

(iv) Linear Shrinkage (%)

The length (L1) of the formed body before sintering and the length (L2) of the sintered body were measured, and the linear shrinkage was calculated according to the following formula:

$$\text{Linear shrinkage (\%)} = \frac{L1 - L2}{L1} \times 100$$

EXAMPLE 1

Zeolite 4A (sodium type zeolite marketed under the tradename of "Toyo Builder" by Toyo Soda Kogyo) was ion-exchanged in a 10% aqueous solution of calcium chloride, washed with water and dried to obtain a calcium type zeolite (zeolite 5A) having a composition of (0.03NaO. 0.97CaO).0.96Al₂O₃.185SiO₂. The average particle size of the obtained zeolite 5A was 1.5 μm. The X-ray diffraction chart of the obtained zeolite 5A is shown in FIG. 1.

The so-obtained zeolite 5A powder was pulverized, packed into a mold and subjected to rubber press forming under a pressure of 500 kg/cm² to obtain a formed body having a diameter of 45 mm and a height of 5 mm.

The formed body was placed in an electric furnace and the temperature was elevated to a sintering temperature of 920° C. at a rate of 5° C./min, and the formed body was maintained at this temperature for 3 hours. Then, the sintered body was cooled and taken out.

The density of the obtained sintered body was 2.61 g/cc (theoretical density=2.75 g/cc), the linear shrinkage was 30%, and the flexural strength was 16 kg/mm².

Figure 2:
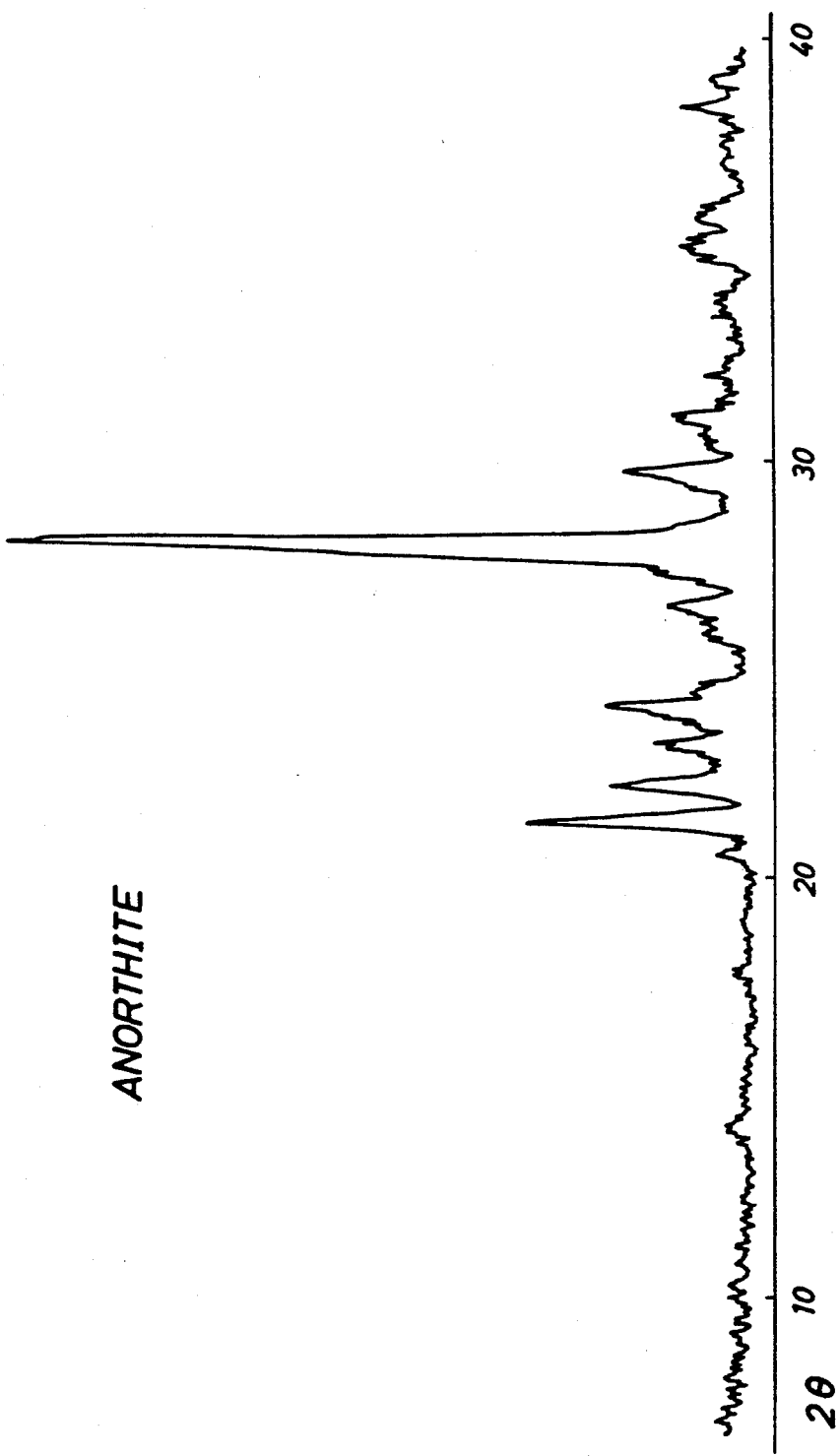
FIG. 2 is an X-ray diffraction chart of anorthite obtained in Example 1.

By the X-ray diffractometry, it was confirmed that the sintered body was anorthite. The X-ray diffraction chart of the obtained anorthite is shown in FIG. 2.

EXAMPLE 2

Zeolite X (marketed under the tradename of "Zeostar CX-100P" by Nippon Kagaku; the calcium concentration in the ion exchange portion is 65%) was ion-exchanged in a 10% aqueous solution to calcium chloride, washed with water and dried to obtain a calcium type zeolite having a composition of (0.05Na₂O.0.9-5CaO) .1.0Al₂O₃.2.5Sio₂. Sintering was carried out in the same manner as described in Example 1 except that the so-obtained calcium type zeolite was used.

Figure 3:
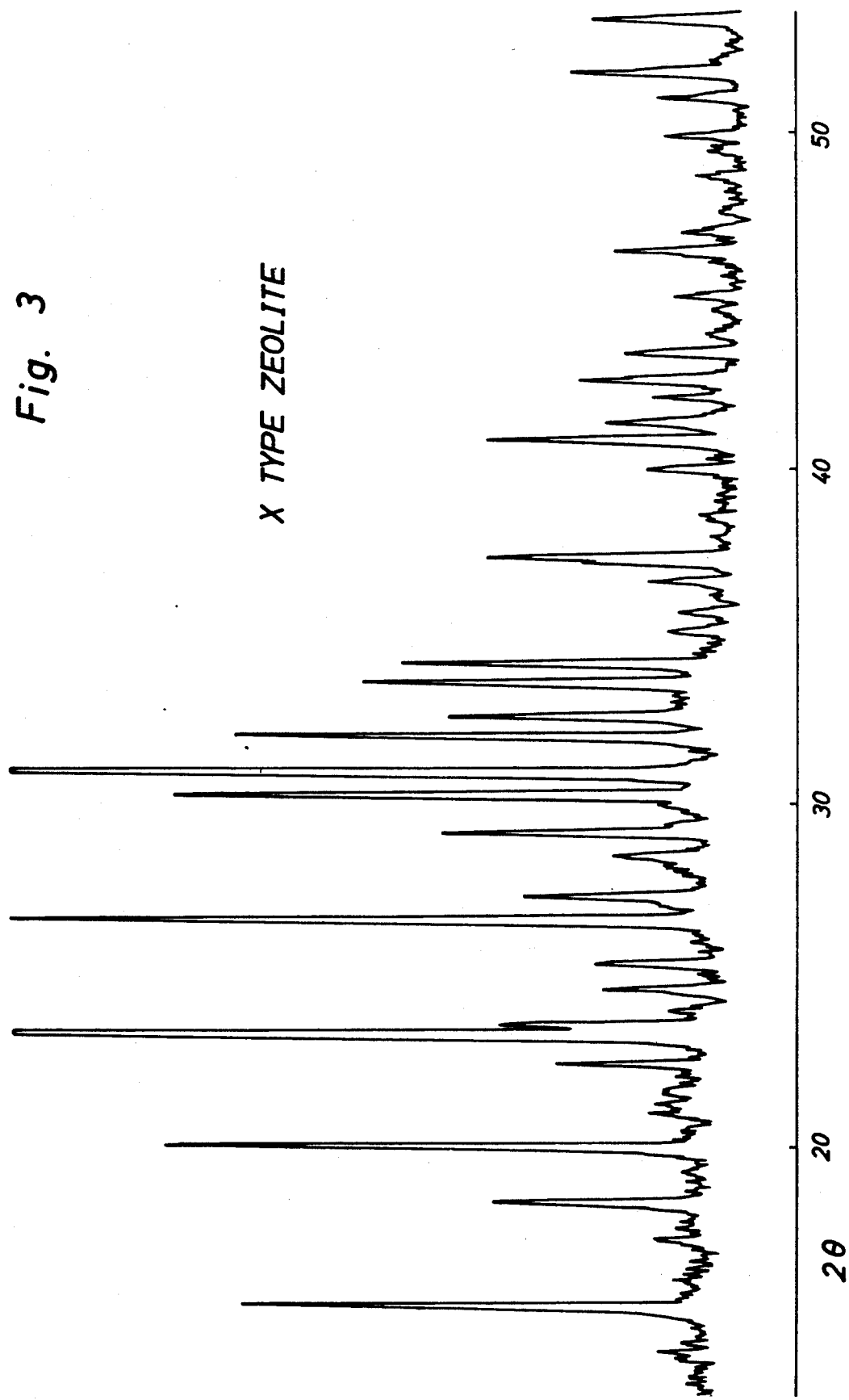
FIG. 3 is an X-ray diffraction chart of calcium type zeolite prepared in Example 2.

Incidentally, the average particle of the above-mentioned calcium type zeolite was 4 μm, and the X-ray diffraction chart of the calcium type zeolite is shown in FIG. 3.

The density of the obtained sintered body was 2.60 g/cc, the linear shrinkage was 30%, and the flexural strength was 14 kg/mm$^2$.

The sintered body was identified as anorthite by the X-ray diffractometry.

EXAMPLE 3

A sintered body was prepared in the same manner as described in Example 1 except that an alkaline earth metal compound shown in Table 1 was added in an amount shown in Table 1 to the zeolite 5A and the mixture was sintered. The obtained sintered body was identified as anorthite by the X-ray diffractometry.

The density, linear shrinkage and flexural strength of the obtained sintered body were determined. The obtained results are shown in Table 1.

obtained sintered body was identified as anorthite by the X-ray diffractometry.

The density of the obtained sintered body was 2.60 g/cc, the linear shrinkage was 20.0%, and the flexural strength was 15 kg/mm$^2$.

EXAMPLE 5

A sintered body was obtained in the same manner as described in Example 4 except that an alkaline earth metal compound shown in Table 2 was added in an amount shown in Table 2 to the zeolite 5A and the calcination and sintering conditions were changed as shown in Table 2.

The obtained sintered body was identified as anorthite by the X-ray diffractometry.

The sensity, linear shrinkage and flexural strength of the sintered body were measured. The obtained results are shown in Table 2.

TABLE 2

| | Starting Materials | | | | | | | |
|---|---|---|---|---|---|---|---|---|
| | Zeolite ($jCaO.kNa_2O).1Al_2O_3.mSiO_2$ | | | | | Alkaline earth metal compound | | |
| Run No. | j | k | l | m | $SiO_2/Al_2O_3$ | kind | average particle size (μm) | mixing ratio (% by weight) |
| 1 | 0.92 | 0.08 | 0.96 | 1.85 | 1.93 | CaO | 0.5 | 0.5 |
| 2 | 0.92 | 0.08 | 0.96 | 1.85 | 1.93 | MgO | 0.5 | 0.5 |
| 3 | 0.94 | 0.06 | 0.96 | 1.85 | 1.93 | SrO | 1.0 | 1.0 |
| 4 | 0.94 | 0.06 | 0.96 | 1.85 | 1.93 | BaO | 0.5 | 1.0 |

| | Calcination Conditions | | Sintering Conditions | | Results | | |
|---|---|---|---|---|---|---|---|
| Run No. | temperature (°C.) | time (hr) | temperature (°C.) | time (hr) | density (g/cc) | linear shrinkage (%) | flexural strength (kg/mm$^2$) |
| 1 | 830 | 5 | 880 | 5 | 2.53 | 17.7 | 15 |
| 2 | 830 | 5 | 895 | 5 | 2.64 | 19.4 | 17 |
| 3 | 830 | 5 | 890 | 3 | 2.62 | 20.1 | 15 |
| 4 | 830 | 5 | 890 | 3 | 2.65 | 20.4 | 16 |

EXAMPLE 6

A sintered body was prepared in the same manner as described in Example 5 except that a zeolite of a composition shown in Table 3 obtained by ion-exchanging zeolite X as in Example 2 was used instead of the zeolite 5A used in Example 5 and the calcination and sintering conditions were changed as shown in Table 3.

The obtained sintered body was identified as anorthite by the X-ray diffractometry.

The density, linear shrinkage and flexural strength of the sintered body were measured. The obtained results are shown in Table 3.

TABLE 1

| | Starting Materials | | | | | | | | Sintering Conditions | | Results | | |
|---|---|---|---|---|---|---|---|---|---|---|---|---|---|
| | Zeolite ($jCaO.kNa_2O).1Al_2O_3.mSiO_2$ | | | | | Alkaline earth metal compound | | | | | | | |
| Run No. | j | k | l | m | $SiO_2/Al_2O_3$ | kind | average particle size (μm) | mixing ratio (% by weight) | temperature (°C) | time (hr) | density (g/cc) | linear shrinkage (%) | flexural strength (kg/mm$^2$) |
| 1 | 0.97 | 0.03 | 0.96 | 1.85 | 1.93 | MgO | 0.5 | 0.5 | 885 | 3 | 2.61 | 31 | 17 |
| 2 | 0.97 | 0.03 | 0.96 | 1.85 | 1.93 | CaO | 0.5 | 0.5 | 890 | 3 | 2.62 | 31 | 16 |
| 3 | 0.97 | 0.03 | 0.96 | 1.85 | 1.93 | SrO | 1.0 | 0.5 | 890 | 3 | 2.60 | 30 | 15 |
| 4 | 0.97 | 0.03 | 0.96 | 1.85 | 1.93 | BaO | 0.5 | 0.5 | 890 | 3 | 2.62 | 31 | 17 |

EXAMPLE 4

The zeolite 5A powder prepared and used in Example 1 was calcined at 850° C. for 3 hours before the forming operation. The obtained powder was identified as being amorphous by the X-ray diffractometry. The powder was pulverized, and by using the pulverized powder, molding and sintering were carried out in the same manner as described in Example 1 except that sintering was conducted at 920° C. for 3 hours. The

TABLE 3

| | Starting Materials | | | | | | | |
|---|---|---|---|---|---|---|---|---|
| | Zeolite ($jCaO.kNa_2O).1Al_2O_3.mSiO_2$ | | | | | Alkaline earth metal compound | | |
| Run No. | j | k | l | m | $SiO_2/Al_2O_3$ | kind | average particle size (μm) | mixing ratio (% by weight) |
| 1 | 0.95 | 0.05 | 1.0 | 2.5 | 2.5 | CaO | 0.5 | 0.5 |

TABLE 3-continued

| | | | | | | | | |
|---|---|---|---|---|---|---|---|---|
| 2 | 0.95 | 0.05 | 1.0 | 2.5 | 2.5 | MgO | 0.5 | 0.2 |

| | Calcination Conditions | | Sintering Conditions | | Results | | |
|---|---|---|---|---|---|---|---|
| Run No. | temperature (°C.) | time (hr) | temperature (°C.) | time (hr) | density (g/cc) | linear shrinkage (%) | flexural strength (kg/mm²) |
| 1 | 850 | 2 | 900 | 3 | 2.62 | 18.2 | 14 |
| 2 | 850 | 2 | 900 | 4 | 2.60 | 18.0 | 15 |

EXAMPLE 7

An alkaline earth metal compound shown in Table 4 was added in an amount shown in Table 4 to a calcined powder of zeolite 5A prepared according to the method described in Example 4 under calcination conditions shown in Table 4, and the mixture was incorporated and dispersed in a mixed solvent of toluene, ethanol and butanol by using a ball mill. Then, polyvinyl butyral as the organic binder and a plasticizer were added to the dispersion. Then, the mixture was defoamed and formed into a sheet according to the doctor blade method. Then, the sheet was heated to remove the binder. Then, the sheet was sinted under conditions shown in Table 4, followed by cooling, to obtain a sheet-shaped sintered body.

The sintered body was identified as anorthite by the X-ray diffractometry.

The density, linear shrinkage and flexural strength of the sintered body were measured. The obtained results are shown in Table 4.

Incidentally, in Run No. 11, silica sol (Cataloid SI-30 supplied by Shokubai Kasei; the average particle size is smaller than 0.1 μm) was used in an amount of 3.4% by weight in combination with the alkaline earth metal compound.

COMPARATIVE EXAMPLE 1

The procedures of Example 1 were repeated in the same manner except that a zeolite having an $SiO_2/Al_2O_3$ molar ratio of 7.0 to 8.0 (Mordenite NM-100P supplied by Nippon Kagaku Kogyo) was used instead of the zeolite 5A used in Example 1 and sintering was carried out at 950° C. for 5 hours. A sintered body was not formed at all.

COMPARATIVE EXAMPLE 2

A mixture of 3.1 g of kaoline (reagent class supplied by Wako Junyaku) and 10 g of calcium hydroxide (reagent class supplied by Wako Junyaku) was formed and sintered in the same manner as described in Example 1. When sintering was conducted at 1000° C. for 5 hours, peaks of anorthite were not found in the X-ray diffraction pattern, and only the presence of peaks of gehlenite ($2CaO.Al_2O_3.SiO_2$) and pseudowollastonile ($CaO.SiO_2$) were found. Furthermore, sintering was not advanced, and only a porous product having a density of 1.95 was obtained. When sintering was carried out at 1300° C. for 5 hours, formation of anorthite was confirmed by the X-ray diffractometry, and sintering was advanced and a dense sintered body having a density of 2.60 was obtained.

We claim:

1. An anorthite sintered body obtained by sintering a formed body of (i) an amorphous calcination product

TABLE 4

| | Starting Materials | | | | | | | |
|---|---|---|---|---|---|---|---|---|
| | Zeolite ($jCaO.kNa_2O).1Al_2O_3.mSiO_2$ | | | | $SiO_2/Al_2O_3$ | Alkaline earth metal compound | | |
| Run No. | j | k | l | m | | kind | average particle size (μm) | mixing ratio (% by weight) |
| 1 | 0.94 | 0.06 | 0.96 | 1.85 | 1.93 | CaO | 0.5 | 0.5 |
| 2 | 0.94 | 0.06 | 0.96 | 1.85 | 1.93 | $CaCO_3$ | 1.0 | 0.89 |
| 3 | 0.95 | 0.05 | 0.96 | 1.85 | 1.93 | MgO | 0.5 | 0.1 |
| 4 | 0.95 | 0.05 | 0.96 | 1.85 | 1.93 | MgO | 0.5 | 0.5 |
| 5 | 0.95 | 0.05 | 0.96 | 1.85 | 1.93 | MgO | 0.5 | 1.0 |
| 6 | 0.95 | 0.05 | 0.96 | 1.85 | 1.93 | MgO | 2.0 | 1.05 |
| 7 | 0.95 | 0.05 | 0.96 | 1.85 | 1.93 | SrO | 1.0 | 0.5 |
| 8 | 0.95 | 0.05 | 0.96 | 1.85 | 1.93 | $Sr(OH)_2$ | 2.0 | 0.59 |
| 9 | 0.95 | 0.05 | 0.96 | 1.85 | 1.93 | BaO | 0.5 | 0.5 |
| 10 | 0.95 | 0.05 | 0.96 | 1.85 | 1.93 | $Ba(OH)_2$ | 2.0 | 0.56 |
| 11* | 0.95 | 0.05 | 0.96 | 1.85 | 1.93 | MgO | 0.5 | 0.5 |

| | Calcination Conditions | | Sintering Conditions | | Results | | |
|---|---|---|---|---|---|---|---|
| Run No. | temperature (°C.) | time (hr) | temperature (°C.) | time (hr) | density (g/cc) | linear shrinkage (%) | flexural strength (kg/mm²) |
| 1 | 830 | 5 | 900 | 3 | 2.68 | 18.9 | 18 |
| 2 | 830 | 5 | 900 | 3 | 2.63 | 18.4 | 15 |
| 3 | 830 | 5 | 905 | 3 | 2.68 | 18.9 | 17 |
| 4 | 830 | 5 | 895 | 3 | 2.65 | 18.6 | 17 |
| 5 | 830 | 5 | 880 | 3 | 2.62 | 18.3 | 16 |
| 6 | 830 | 5 | 900 | 3 | 2.62 | 18.2 | 14 |
| 7 | 830 | 5 | 900 | 3 | 2.60 | 18.0 | 15 |
| 8 | 830 | 5 | 900 | 3 | 2.55 | 17.5 | 14 |
| 9 | 830 | 5 | 900 | 3 | 2.65 | 18.6 | 16 |
| 10 | 830 | 5 | 900 | 3 | 2.57 | 17.7 | 16 |
| 11* | 830 | 5 | 895 | 3 | 2.63 | 18.2 | 18 | obtained by calcining a calcium zeolite having an $SiO_2/Al_2O_3$ molar ratio lower than 3 (ii) a mixture of said amorphous calcination product and an alkaline earth metal compound or (iii) a mixture of calcium zeolite having an $SiO_2Al_2O_3$ molar ratio lower than 3 and an alkaline earth metal compound.

2. The anorthite sintered body of claim 1 obtained by sintering a formed body of said amorphous calcination product (i).

3. The anorthite sintered body of claim 1 obtained by sintering a formed body of said mixture (ii) of the amorphous calcination product and an alkaline earth metal compound.

4. The anorthite sintered body of claim 3 wherein said alkaline earth metal compound is an oxide of calcium, magnesium, strontium or barium.

5. The anorthite sintered body of claim 3 wherein said alkaline earth metal compound is calcium oxide.

6. A process for the preparation of an anorthite sintered body which comprises preparing a formed body of a powdery mixture of a calcium zeolite having a $SiO_2/Al_2O_3$ molar ratio lower than 3 and an alkaline earth metal compound, and sintering the formed body at a temperature lower than 1,000° C.

7. A preparation process according to claim 6, wherein the alkaline earth metal compound is calcium oxide, magnesium oxide, strontium oxide or barium oxide.

8. A preparation process according to claim 6 wherein the alkaline earth metal compound is calcium oxide.

9. The process of claim 6 wherein the calcium zeolite is a calcium zeolite A.

10. The process of claim 6 wherein the $SiO_2/Al_2O_3$ molar ratio is not more than 2.5.

11. The process of claim 6 wherein the sintering temperature is 850° to 950° C.

12. A process for the preparation of an anorthite sintered body which comprises preparing a formed body of a powder of an amorphous calcination product obtained by calcining a calcium zeolite having a $SiO_2/Al_2O_3$ molar ratio lower than 3, and sintering the formed body at a temperature lower than 1,000° C.

13. The process of claim 12 wherein the calcium zeolite is a calcium zeolite A.

14. The process of claim 12 wherein the $SiO_2/Al_2O_3$ molar ratio is not more than 2.5.

15. The process of claim 12 wherein the sintering temperature is 850° to 950° C.

16. A process for the preparation of an anorthite sintered body which comprises preparing a formed body of a powdery mixture of an amorphous calcination product obtained by calcining a calcium zeolite having an $SiO_2/Al_2O_3$ molar ratio lower than 3 and an alkaline earth metal compound, and sintering the formed body at a temperature lower than 1,000° C.

17. A preparation process according to claim 16 wherein the alkaline earth metal compound is calcium oxide.

18. The process of claim 16 wherein the calcium zeolite is a calcium zeolite A.

19. The process of claim 16 wherein the $SiO_2/Al_2O_3$ molar ratio is not more than 2.5.

20. The process of claim 16 wherein the sintering temperature is 850° to 950° C.

* * * * *